United States Patent [19]
Hagersten et al.

[11] Patent Number: 5,802,563
[45] Date of Patent: Sep. 1, 1998

[54] EFFICIENT STORAGE OF DATA IN COMPUTER SYSTEM WITH MULTIPLE CACHE LEVELS

[75] Inventors: Erik E. Hagersten, Palo Alto; Mark D. Hill, Los Altos, both of Calif.

[73] Assignee: Sun Microsystems, Inc., Palo Alto, Calif.

[21] Appl. No.: 674,029

[22] Filed: Jul. 1, 1996

[51] Int. Cl.$^6$ .................................................. G06F 12/00
[52] U.S. Cl. ........................................... 711/122; 711/141
[58] Field of Search ........................... 364/134; 395/464, 395/497.04; 711/122

[56] References Cited

U.S. PATENT DOCUMENTS

| | | | |
|---|---|---|---|
| 5,136,700 | 8/1992 | Thacker | 395/449 |
| 5,237,673 | 8/1993 | Orbits et al. | 395/497.01 |
| 5,450,563 | 9/1995 | Gregor | 395/403 |
| 5,535,116 | 7/1996 | Gupta et al. | 364/134 |
| 5,537,573 | 7/1996 | Ware et al. | 395/464 |
| 5,588,138 | 12/1996 | Bai | 395/497.04 |
| 5,592,671 | 1/1997 | Hiyayama | 395/674 |
| 5,634,110 | 5/1997 | Laudon et al. | 395/472 |
| 5,640,520 | 6/1997 | Tetrick | 395/293 |

*Primary Examiner*—Tod R. Swann
*Assistant Examiner*—David Langjahr
*Attorney, Agent, or Firm*—Conley, Rose & Tayon; B. Noel Kivlin

[57] ABSTRACT

Memory space in the lower-level cache (LLC) of a computer system is allocated in cache-line sized units, while memory space in the higher-level cache (HLC) of the computer system is allocated in page sized units; with each page including two or more cache lines. Accordingly, during the execution of a program, cache-line-sized components of a page-sized block of data are incrementally stored in the cache lines of the LLCs. Subsequently, the system determines that it is time to review the allocation of cache resources, i.e., between the LLC and the HLC. The review trigger may be external to the processor, e.g., a timer interrupting the processor on a periodic basis. Alternatively, the review trigger may be from the LLC or the HLC, e.g., when the LLC is full, or when usage of the HLC drops below a certain percentage. A review of the allocation involves identifying components associated with their respective blocks of data and determining if the number of cached components identified with the blocks exceed a threshold. If the threshold is exceeded for cached components associated with a particular block, space is allocated in the HLC for storing components from the block. This scheme advantageously increases the likelihood of future cache hits by optimally using the HLC to store blocks of memory with a substantial number of uses components.

13 Claims, 8 Drawing Sheets

EFFICIENT STORAGE OF DATA IN COMPUTER SYSTEM WITH MULTIPLE CACHE LEVELS

BACKGROUND OF THE INVENTION

Field of the Invention

This invention relates to memories in computer systems. In particular, this invention relates to the efficient selection of memory storage modes in these computer systems.

Incorporation by Reference

This patent application is related to the following copending, commonly assigned patent applications, the disclosures of which are incorporated herein by reference in their entirety:

1. "Extending The Coherence Domain Beyond A Computer System Bus" by Hagersten et al., Ser. No. 08/673,059, filed concurrently herewith. (Reference Number P990)

2. "Method And Apparatus Optimizing Global Data Replies In A Computer System" by Hagersten, Ser. No. 08/675,284, filed concurrently herewith. (Reference Number P991)

3. "Method And Apparatus Providing Short Latency Round-Robin Arbitration For Access To A Shared Resource" by Hagersten et al., Ser. No. 08/675,286, filed concurrently herewith. (Reference Number P992)

4. "Implementing Snooping On A Split-Transaction Computer System Bus" by Singhal et al., Ser. No. 08/673,038, filed concurrently herewith. (Reference Number P993)

5. "Split Transaction Snooping Bus Protocol" by Singhal et al., Ser. No. 08/673,967, filed concurrently herewith. (Reference Number P989)

6. "Interconnection Subsystem For A Multiprocessor Computer System With A Small Number Of Processors Using A Switching Arrangement Of Limited Degree" by Heller et al., Ser. No. 675,629, filed concurrently herewith. (Reference Number P1609)

7. "System And Method For Performing Deadlock Free Message Transfer In Cyclic MultiHop Digital Computer Network" by Wade et al., Ser. No. 08/674,277, filed concurrently herewith. (Reference Number P1572)

8. "Synchronization System And Method For Plesiochronous Signaling" by Cassiday et al., Ser. No. 08/674,316, filed concurrently herewith. (Reference Number P1593)

9. "Methods And Apparatus For A Coherence Transformer For Connecting Computer System Coherence Domains" by Hagersten et al., Ser. No. 08/677,015 filed concurrently herewith. (Reference Number P1519)

10. "Methods And Apparatus For A Coherence Transformer With Limited Memory For Connecting Computer System Coherence Domains" by Hagersten et al., Ser. No. 677,014, filed concurrently herewith. (Reference Number P1530)

11. "Methods And Apparatus For Sharing Stored Data Objects In A Computer System" by Hagersten et al., Ser. No. 08/673,130, filed concurrently herewith. (Reference Number P1463)

12. "Methods And Apparatus For A Directory-Less Memory Access Protocol In A Distributed Shared Memory Computer System" by Hagersten et al., Ser. No. 08/671,303, filed concurrently herewith. (Reference Number P1531)

13. "Hybrid Memory Access Protocol In A Distributed Shared Memory Computer System" by Hagersten et al., Ser. No. 08/673,957, filed concurrently herewith. (Reference Number P1550)

14. "Methods And Apparatus For Substantially Memory-Less Coherence Transformer For Connecting Computer System Coherence Domains" by Hagersten et al., Ser. No. 08/677,012, filed concurrently herewith. (Reference Number P1529)

15. "A Multiprocessing System Including An Enhanced Blocking Mechanism For Read To Share Transactions In A NUMA Mode" by Hagersten, Ser. No. 08/674,271, filed concurrently herewith. (Reference Number P1786)

16. "Encoding Method For Directory State In Cache Coherent Distributed Shared Memory Systems" by Guzovskiy et al., Ser. No. 08/672,946, filed concurrently herewith. (Reference Number P1520)

17. "Software Use Of Address Translation Mechanism" by Nesheim et al., Ser. No. 673,043, filed concurrently herewith. (Reference Number P1560)

18. "Directory-Based, Shared-Memory, Scaleable Multiprocessor Computer System Having Deadlock-free Transaction Flow Sans Flow Control Protocol" by Lowenstein et al., Ser. No. 674,358, filed concurrently herewith. (Reference Number P1561)

19. "Maintaining A Sequential Stored Order (SSO) In A Non-SSO Machine" by Nesheim,Ser. No. 08/673,048 filed concurrently herewith. (Reference Number P1562)

20. "Node To Node Interrupt Mechanism In A Multiprocessor System" by Wong- Chan,Ser. No. 08/672,942 filed concurrently herewith. (Reference Number P1587)

21. "Deterministic Distributed Multicache Coherence Protocol" by Hagersten et al., Ser. No. 08/630,703 filed Apr. 8, 1996, Ser. No. 08/630,703. (Reference Number P948)

22. "A Hybrid NUMA Coma Caching System And Methods For Selecting Between The Caching Modes" by Hagersten et al., Ser. No. 08/577,283, filed Dec. 12, 1995, Ser. No. 08/577,283. (Reference Number P1003)

23. "A Hybrid NUMA Coma Caching System And Methods For Selecting Between The Caching Modes" by Wood et al., Ser. No. 08/575,787, filed Dec. 22, 1995, Ser. No. 08/575,787. (Reference Number P1004)

24. "Flushing Of Cache Memory In A Computer System" by Hagersten et al., Ser. No. 673,881, filed concurrently herewith. (Reference Number P1416)

25. "Efficient Allocation Of Cache Memory Space In A Computer System" by Hagersten et al., Ser. No. 08/675,306, filed concurrently herewith. (Reference Number P1576)

26. "Skip-level Write-through In A Multi-level Memory Of A Computer System" by Hagersten et al., Ser. No. 08/674,560, filed concurrently herewith. (Reference Number P1736)

27. "A Multiprocessing System Configured to Perform Efficient Write Operations" by Hagersten, Ser. No. 08/675,634, filed concurrently herewith. (Reference Number P1500)

28. "A Multiprocessing System Configured to Perform Efficient Block Copy Operations" by Hagersten, Ser. No. 08/674,267, filed concurrently herewith. (Reference Number P1515)

29. "A Multiprocessing System Including An Apparatus For Optimizing Spin-Lock Operations" by Hagersten, Ser. No. 08/674,272, filed concurrently herewith. (Reference Number P1525)

30. "A Multiprocessing System Configured to Detect and Efficiently Provide for Migratory Data Access Patterns" by Hagersten et al., Ser. No. 08/674,274, filed concurrently herewith. (Reference Number P1555)

31. "A Multiprocessing System Configured to Store Coherency State within Multiple Subnodes of a Processing Node" by Hagersten, Ser. No. 08/674,274, filed concurrently herewith. (Reference Number P1527)

32. "A Multiprocessing System Configured to Perform Prefetching Operations" by Hagersten et al., Ser. No. 08/674,327, filed concurrently herewith. (Reference Number P1571)

33. "A Multiprocessing System Configured to Perform Synchronization Operations" by Hagersten et al., Ser. No. 08/674,328, filed concurrently herewith. (Reference Number P1551)

34. "A Multiprocessing System Having Coherency-Related Error Logging Capabilities" by Hagersten et al., Ser. No. 674,276, filed concurrently herewith. (Reference Number P1719)

35. "Multiprocessing System Employing A Three-Hop Communication Protocol" by Hagersten, Ser. No. 08/674,270, filed concurrently herewith. (Reference Number P1785)

36. "A Multiprocessing System Configured to Perform Software Initiated Prefetch Operations" by Hagersten, Ser. No. 08/674,273, filed concurrently herewith. (Reference Number P1787)

37. "A Multiprocessing Computer System Employing Local and Global Address Spaces and Multiple Access Modes" by Hagersten, Ser. No. 08/675,635, filed concurrently herewith. (Reference Number P1784)

38. "Multiprocessing System Employing A Coherency Protocol Including A Reply Count" by Hagersten et al., Ser. No. 08/674,314, filed concurrently herewith. (Reference Number P1570)

DESCRIPTION OF THE RELATED ART

In a simple cache space allocation scheme for a multi-level-cache computer system having a small first-level cache and a larger second-level cache, all data structures are automatically cached in both levels of caches. If the size of a data structure is larger than the smaller lower-level cache, i.e., the data structure does not fit into the lower-level cache, the data structure is replaced from the lower-level cache. Hence, if the data structure is smaller than the larger higher-level cache, most of the content of the data structure will remain in the higher-level cache.

Unfortunately, while some components of data structures are accessed frequently, other components are accessed only once and it is not easy to predict future access(es) of a particular component without some statistical analysis and/or knowledge of the program which owns the data structure(s). For example, a computer program may use a large array by accessing each element of the array once. Each element is then used in a fairly complicated computation involving temporary variables. In this example, caching every element of the large array will not substantially increase the computational speed. In contrast, caching the temporary variables will result in a faster execution of the program.

Hence, although the above-described scheme is simple, the scheme is inefficient because the probability of a particular component being accessed again is not necessarily related to the size of the parent data structure. Since cache memories are not infinitely large, inefficient use of cache memory space can cause some other useful data structures to be replaced prematurely, i.e., ejected from the cache(s) before subsequent accesses.

Thus there is a need for an efficient mechanism to select data structures for caching which optimizes the allocation of the higher-level cache memory space in a multi-level-cache computer system in order to maximize usage of the caches and minimize overall access time to data.

SUMMARY OF THE INVENTION

The present invention provides an efficient scheme for selecting memory storage modes of a multi-level cache hierarchy of a computing system having at least a lower-level cache (LLC) and a higher-level cache (HLC).

In one embodiment, memory space in the lower-level cache (LLC) is allocated in cache-line sized units, while memory space in the higher-level cache (HLC) is allocated in page sized units; with each page including two or more cache lines. Note however that though the exemplary memory units employed for storing components and blocks of data are cache lines and pages, respectively, this invention is also applicable to other memory units and sub-units.

Accordingly, during the execution of a program, cache-line-sized components of a page-sized block of data are incrementally stored in the cache lines of the LLCs. Subsequently, the system determines that it is time to review the allocation of cache resources, i.e., between the LLC and the HLC. The review trigger may be external to the processor, e.g., a timer interrupting the processor on a periodic basis. Alternatively, the review trigger may be from the LLC or the HLC, e.g., when the LLC is full, or when usage of the HLC drops below a certain percentage.

A review of the allocation involves identifying components associated with their respective blocks of data and determining if the number of cached components identified with the blocks exceed a threshold. If the threshold is exceeded for cached components associated with a particular block, space is allocated in the HLC for storing components from the block. This scheme advantageously increases the likelihood of future cache hits by optimally using the HLC to store blocks of memory with a substantial number of useful components.

In one embodiment as implemented in a COMA/NUMA computer system, the selection of memory storage locations, i.e., HLC versus LLC, corresponds to the selection of COMA and NUMA caching modes. However, it is understood that the selection scheme is also applicable to all levels of caches and to a wide variety of cache and system architectures, including but not limited to a COMA-only or a NUMA-only cache.

DESCRIPTION OF THE DRAWINGS

The objects, features and advantages of the system of the present invention will be apparent from the following description in which.

DETAILED DESCRIPTION OF THE INVENTION

In the following description, numerous details provide a thorough understanding of the invention. These details include functional blocks and an exemplary cache architecture to aid implementation of a cost-effective scheme for allocating memory resources, e.g., caches, of a computer system. In addition, while the present invention is described with reference to a specific cache allocation scheme which involves mode selection for a NUMA/COMA multiprocessor computer system, the invention is applicable to a wide range of cache and system architectures. In other instances, well-known circuits and structures are not described in detail so as not to obscure the invention unnecessarily.

The above-identified pending applications disclose a hybrid cache-only memory architecture/non-uniform memory architecture (COMA/NUMA) having a shared global memory address space and a coherent caching system for a networked computing system, which provides a suitable exemplary hardware environment for implementing the present invention.

Figure 1A:
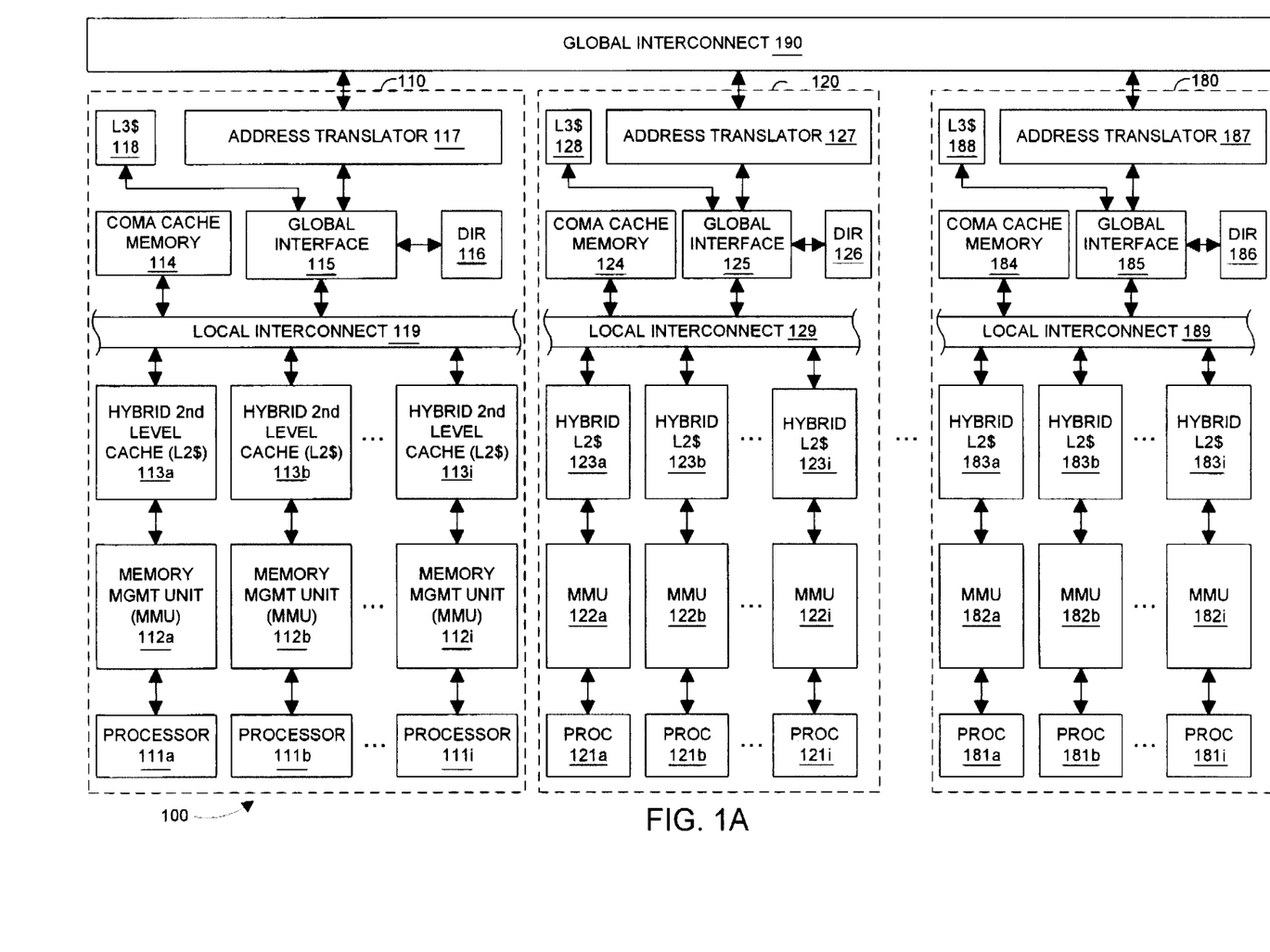
FIG. 1A is a block diagram showing a networked computering system 100 with a hybrid cache-only memory architecture/non-uniform memory architecture (COMA/NUMA).
Figure 1B:
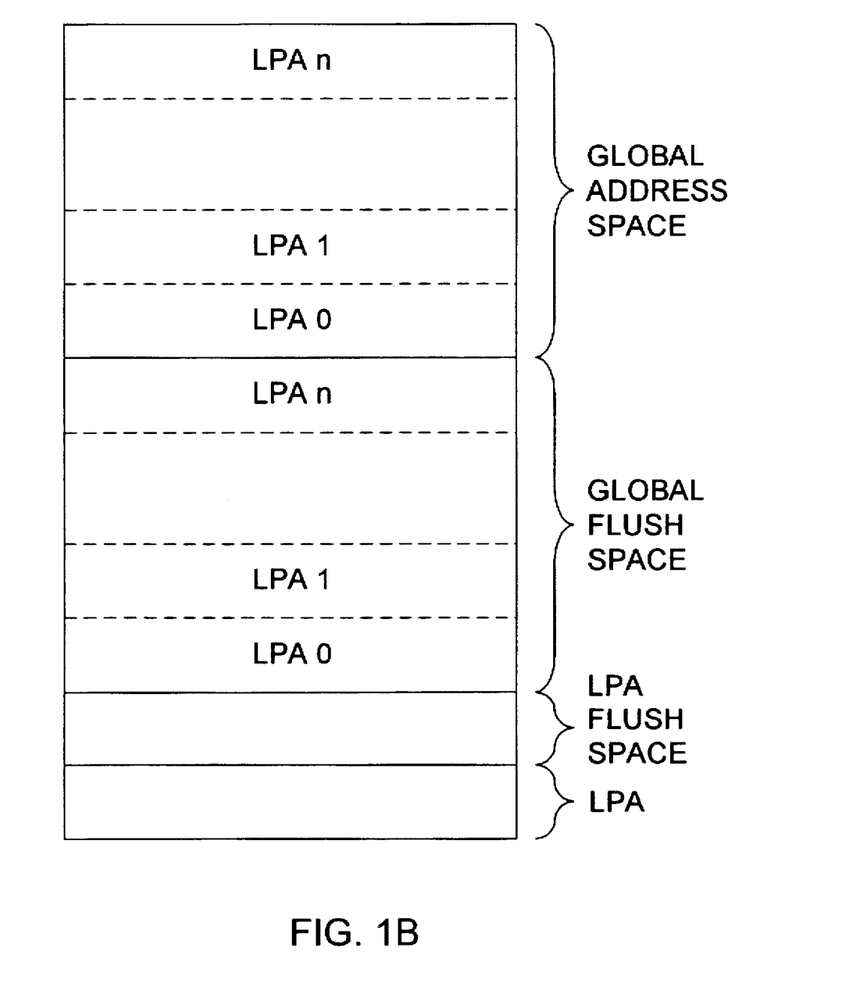
FIG. 1B is an exemplary memory map for a networked computering system of FIG. 1A.

FIG. 1A is a block diagram showing one such hybrid COMA/NUMA computer system 100. System 100 includes a plurality of subsystems (nodes) 110, 120, . . . 180, coupled to each other via a global interconnect 190. Each subsystem is assigned a unique network node address. Each subsystem includes one or more processors, a corresponding number of memory management units (MMUs) and hybrid second-level caches (L2$s), a COMA cache/memory, a global interface, a third-level cache (L3$) and a local interconnect. For example, subsystem 110 includes processors 111a, 111b . . . 111i, MMUs 112a, 112b, . . . 112i, L2$s 113a, 113b, . . . 113i, COMA cache/memory 114, global interface 115, L3$ 118 and local interconnect 119. In this example, each of processors 111a, 111b, . . . 111i may include an optional compact first level cache (L1$) (not shown in FIG. 1A).

In order to support a directory-based cache coherency scheme, subsystems 110, 120, . . . 180 also include directories 116, 126, . . . 186 coupled to global interfaces 115, 125, . . . 185, respectively. Data originating from, i.e., whose "home" location is, anyone of COMA caches/memories 114, 124, . . . 184 may be duplicated in attraction memory (AM) of system 100. For example, in COMA mode, a subsystem's cache includes both COMA cache/memories 114, 124, . . . 184 and L2$s 1113a . . . 113i, 123a . . . 123i, and 183a . . . 183i, and data whose "home" is in cachememory 114 of subsystem 110 may be duplicated in one or more of cache memories 124, . . . 184 and may also be duplicated in one or more of L2$s 113a . . . 113i, 123a . . . 123i, and 183a . . . 183i. Alternatively, in NUMA mode, a subsystem's cache includes L2$s 113a . . . 113i, 123a . . . 123i, and 183a . . . 183i, and data whose "home" is in cache memory 114 of subsystem 110 may be duplicated in one or more of L2$s 113a. . . 113i, 123a . . . 123i, and 183a . . . 183i and possibly in L3$ 118, 128 . . . 188.

In one embodiment of the present invention, as implemented in the exemplary hybrid COMA/NUMA computer system 100 of FIG. 1A, the "home" location of data is in COMA cache/memory 124 of subsystem 120, i.e., subsystem 120 is both the home and owner subsystem for the data. Copies of the data can also be stored in the attraction memory (AM) space of one or more of requesting subsystems, for example, in the AM space of requesting subsystem 110 by allocating space in COMA cache memory 114 and/or in hybrid second-level caches (L2$s) 113a, 113b, . . . 113i. See pending patent applications "A Hybrid NUMA Coma Caching System And Methods For Selecting Between The Caching Modes" by Hagersten et al., filed Dec. 22, 1995, Ser. No. 08/577,283. (Reference Number P1003) and "A Hybrid NUMA Coma Caching System And Methods For Selecting Between The Caching Modes" by Wood et al., filed Dec. 22, 1995, Ser. No. 08/575,787. (Reference Number P1004) which describe in detail the hybrid COMA/NUMA architecture and methods for exploiting the hybrid cache architecture.

Home directory 126 is responsible for maintaining a master record of existing copies of the home page throughout system 100. In addition, memory tags (MTAGs) associated with the respective AM directories, e.g., directories 116 and 186, track the status of the local copies in each requesting subsystem using one of four exemplary states. An invalid ("I") state indicates that a particular subsystem does not have a (cached) copy of a data line of interest. A shared ("S") state indicates that the subsystem, and possibly other subsystems, have a shared (cached) copy of the data line of interest. An owned ("O") state indicates that the subsystem, and possibly other subsystems, have a (cached) copy of the data line of interest. The subsystem with the O copy is required to perform a write-back upon replacement. A modified ("M") state indicates that the subsystem has the only (cached) copy of the data line of interest, i.e., the subsystem is the sole owner of the data line and there are no S copies in the other subsystems.

In this implementation, inclusion is maintained between the L1$s and the L2$s, but inclusion is not required between the L2$s and third level caches (L3$s). In other words, data that resides in a L1$ also resides in a respective L2$. However, data residing in the L1$ or L2$ do not necessarily have to reside in a respective L3$ as well. Thus, the L3$ may not allocate for a cache line of data even if space is allocated for the cache line of data in the L2$.

In the following description, the selection scheme of the present invention determines if a particular data structure, presently being stored in a lower-level cache (LLC), e.g., L2$ 113a or L3$ 118, should or should not now be stored in a higher-level cache (HLC), e.g., COMA cache 114, of a requesting subsystem 110 in a hybrid COMA/NUMA environment. Accordingly, this selection scheme may be used to determine when data currently being stored in NUMA mode should now be stored in COMA mode. However, it is understood that the selection scheme can also be applicable to all levels of caches and to a variety of cache and system architectures.

Figure 2:
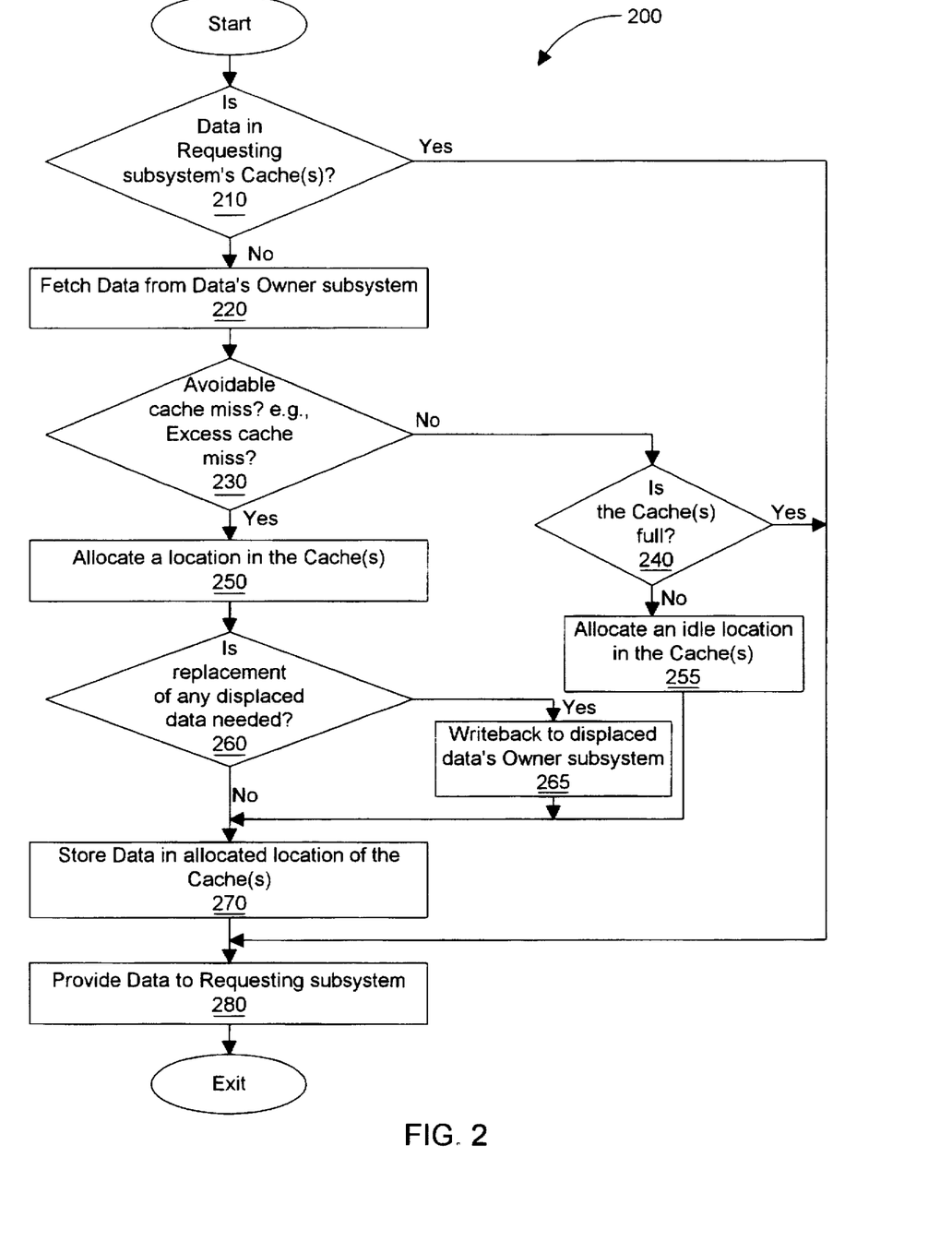
FIG. 2 is a flowchart illustrating a portion of one embodiment of the invention for allocating cache space in a multiprocessor computer system.

FIG. 2 is a flowchart depicting one underlying aspect of the present invention as implemented on multiprocessor computer system 100. Note that for efficiency, both L2$ and L3$ allocate and store data one cache line at a time.

When processor 111a of requesting subsystem 110 makes a request for data, a search for the data is conducted in L2$ 113a and then in L3$ 118 (step 210). If the data is not found within requesting subsystem 110, i.e., a cache miss is detected by subsystem 110, a request is made to home subsystem 120 to fetch the data (step 220). Pending application "A Hybrid NUMA Coma Caching System And Methods For Selecting Between The Caching Modes" by Hagersten et al., filed Dec. 22, 1995, Ser. No. 08/577,283. (Reference Number P1003) discloses how data is fetched from an owner subsystem by first interrogating the directory of the home subsystem.

Requesting subsystem 110 then attempts to determine if the cache miss is an "avoidable" cache miss (step 230). An cache miss is avoidable if cache miss could have been avoided had the data had remained in the L3$ 118. One example of an avoidable cache miss is an "excess" cache miss which is defined as a cache miss preceded by a capacity miss or a conflict miss. Other causes of avoidable cache misses are also contemplated. These cache misses include cache misses which could have been avoidable by reconfiguring L3$ 118 to "free up" new cache space in L3$ 118 instead of replacing older data, by for example, dynamically resizing (increasing the size of) L3$ 118.

In this implementation, home directory 126 of home subsystem 120 maintains a list of requesting subsystem(s) with a shared (S) copy of the data stored in each cache line, for example in an array dir_share_bit [node]; wherein node=1 . . . n and n is the total number of subsystems. In addition, home directory 126 includes the identity of the current owner (owner_id) of the data in each cache line. Where there is no current owner, the owner_id identifies the last owner. Home directory 126 also includes a writeback bit (wb_bit) indicating whether the latest owner has written the data back to the memory or if it is still the owner. The last writer ($last_{13}$ write) of the data can be determined from the respective owner_id and the wb_bit fields in directory 126. Accordingly, an excess cache miss can be represented by a boolean equation such as:

(RTS & dir_share_bit [node]=1) OR (RTO & last_write=node)

wherein RTS is a read-to-share and RTO is a read-to-own

See pending patent application "A Hybrid NUMA Coma Caching System And Methods For Selecting Between The Caching Modes" by Hagersten et al., filed Dec. 22, 1995, Ser. No. 08/577,283. (Reference Number P1003) for a detailed description of an exemplary method of detecting excess cache misses. In one variation of the invention, directory 126 is a directory cache holding state information of the most recently accessed cache line. (See also co-pending application "directory -less protocol and related directory cache P1531). In this variation, only avoidable misses which have their respective entry in this directory cache can cause requesting subsystem 110 to allocate space in L3$ 118.

If requesting subsystem 110 detects an avoidable miss, then a suitable location is allocated in L3$ 118 for storing the data (step 250). The suitable location may be allocated by first looking for an idle location or a location containing invalid or stale data (step 260). If no idle nor invalid location can be found, then a used location is allocated and replacement of the displaced data may be needed. The used location may be selected at random among used locations. Alternatively, a selection criteria such as least-recently-used (LRU) or least-frequently-used (LFU) may be used to select a location from among used locations.

If replacement of the displaced data from the selected used location is required, requesting subsystem 110 sends the displaced data back to its owner subsystem (step 265). Pending application "A Hybrid NUMA Coma Caching System And Methods For Selecting Between The Caching Modes" by Hagersten et al., filed Dec. 22, 1995, Ser. No. 08/577,283. (Reference Number P1003) provides one example of replacing displaced data.

Conversely, if the cache miss is not an avoidable cache miss but there is an idle location in cache 118 (steps 230 and 240), then the idle location in cache 118 is allocated and the data is stored in the allocated location (steps 255 and 270).

Otherwise, if the cache miss is not an avoidable cache miss and if cache 118 is full (steps 230 and 240), then the data is not cached in cache 118.

In each of the above cases, the data is provided to requesting processor 111a (step 280). Note that the data can be provided to requesting processor 111a anytime after the data has been fetched from owner subsystem 120, i.e., it can be provided before or after any required caching step 270.

Figure 3:
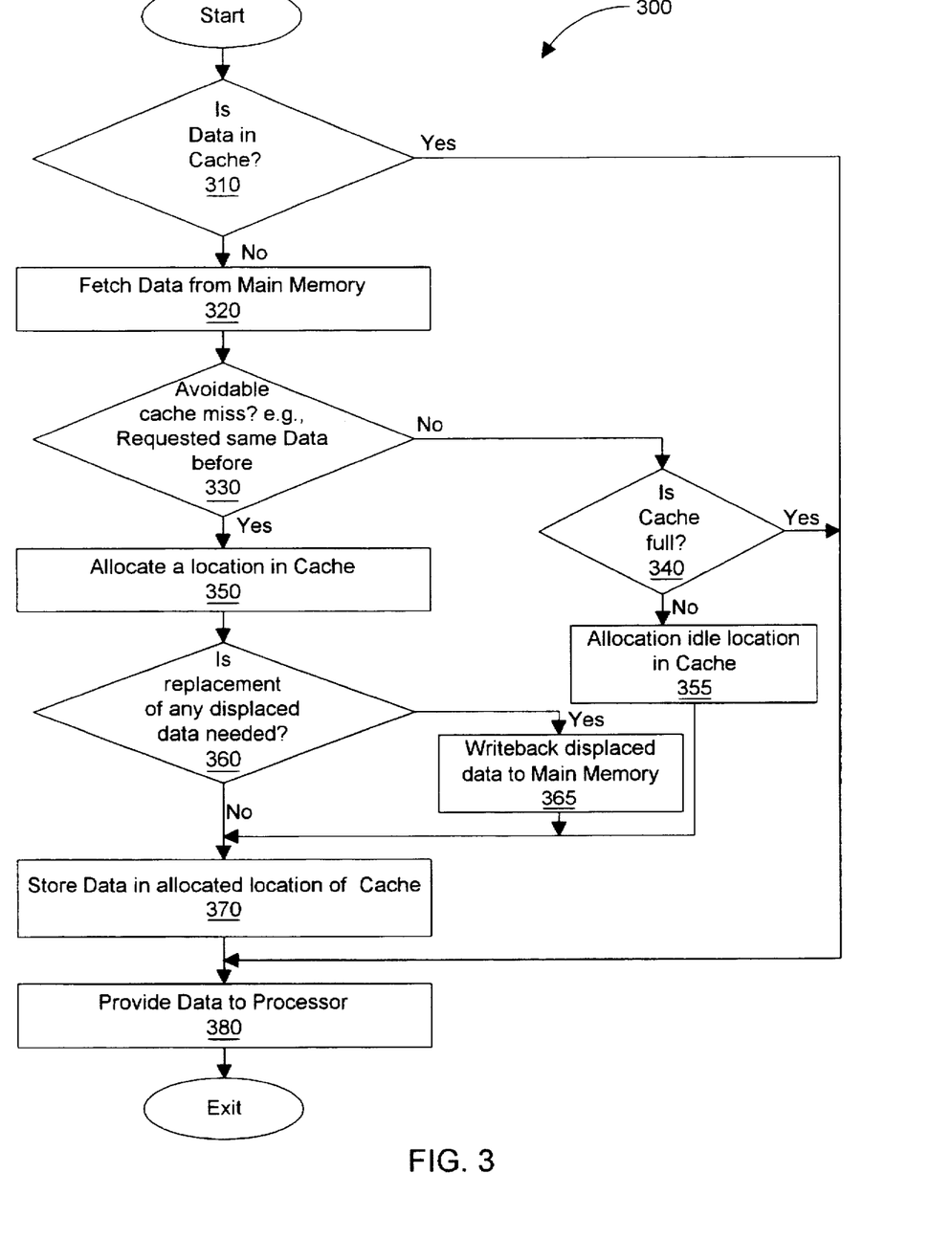
FIG. 3 is a flowchart illustrating a portion of another embodiment of the invention for allocating cache space in a uniprocessor computer system.

FIG. 3 is a flowchart illustrating another embodiment of the present invention implemented in a uniprocessor computer system. Although the following description of the uniprocessor embodiment is based on a computer system having a processor, a cache and a main memory, the selection scheme is also applicable to any uniprocessor computer system with multiple caches and/or memories. For example, the main memory may be a higher-level cache.

When the processor makes a request for data, a search for the data is conducted in the cache (step 310). If the data is not found, i.e., a cache miss is detected, the processor fetches the data from the main memory (step 320).

Processor then attempts to determine if the cache miss is an "avoidable" cache miss (step 330). One example of an avoidable cache miss in a uniprocessor environment is when the same data had previously been requested by the processor and fetched from the main memory to the cache.

If the processor detects an avoidable miss, then a suitable location is allocated in the cache for storing the data (step 350). The suitable location may be allocated by first looking for an idle location or a location containing invalid or stale data (step 360). If no idle nor invalid location can be found, then a used location is allocated and replacement of the displaced data may be needed. The used location may be selected at random or using an algorithm such as LRU or LFU.

If replacement of the displaced data from the selected used location is required, the processor writes back the data to the main memory (step 365). Note that in both uniprocessor and multiprocessor systems where compulsory "write-through" of the cache(s) is enforced, displaced data can simply be discarded since the contents of the cache(s) and memory(s) are always coherent. "Copy-back" caches can also simply discard displaced data if the displaced data has not been modified.

Conversely, if the cache miss is not an avoidable cache miss and if the cache is not full (steps 330 and 340), then the processor allocates an idle location in the cache and the data is stored in the allocated location (steps 355 and 370). Otherwise, if the cache miss is not an avoidable cache miss and if the cache is full (steps 330 and 340), then the data is not cached.

In each of the above cases, the data is provided to the requesting processor (step 380). Note that the data can be provided to the requesting processor before or after any caching step 370.

As discussed above, in accordance with the present invention, as illustrated by FIGS. 4 and 5A–5C, a determination is made as to whether data can be stored more efficiently if space is allocated in page sized units in a higher-level cache (HLC), e.g. in COMA cache 114, instead of allocated in cache-line sized sub-units in a lower-level cache (LLC), e.g. in L2$ 113a and/or L3$ 118. In other words, the selection scheme determines which page(s) of data would benefit from being accessed in the COMA mode, rather than in the NUMA mode.

In this implementation, the size of COMA cache 114 can dynamically change throughout the program execution, and can maximally be equal in size to the node's local memory space. Data cached in COMA cache 114 will not be cached in L3$ 118. Since the COMA cache size can easily be increased and since the hardware overhead for supporting data accesses in COMA cache 114 can be made much lower than the hardware overhead for supporting data accesses in L3$ 118, converting pages from NUMA to COMA mode may lower the data access demands on L3$ 118.

Figure 4:
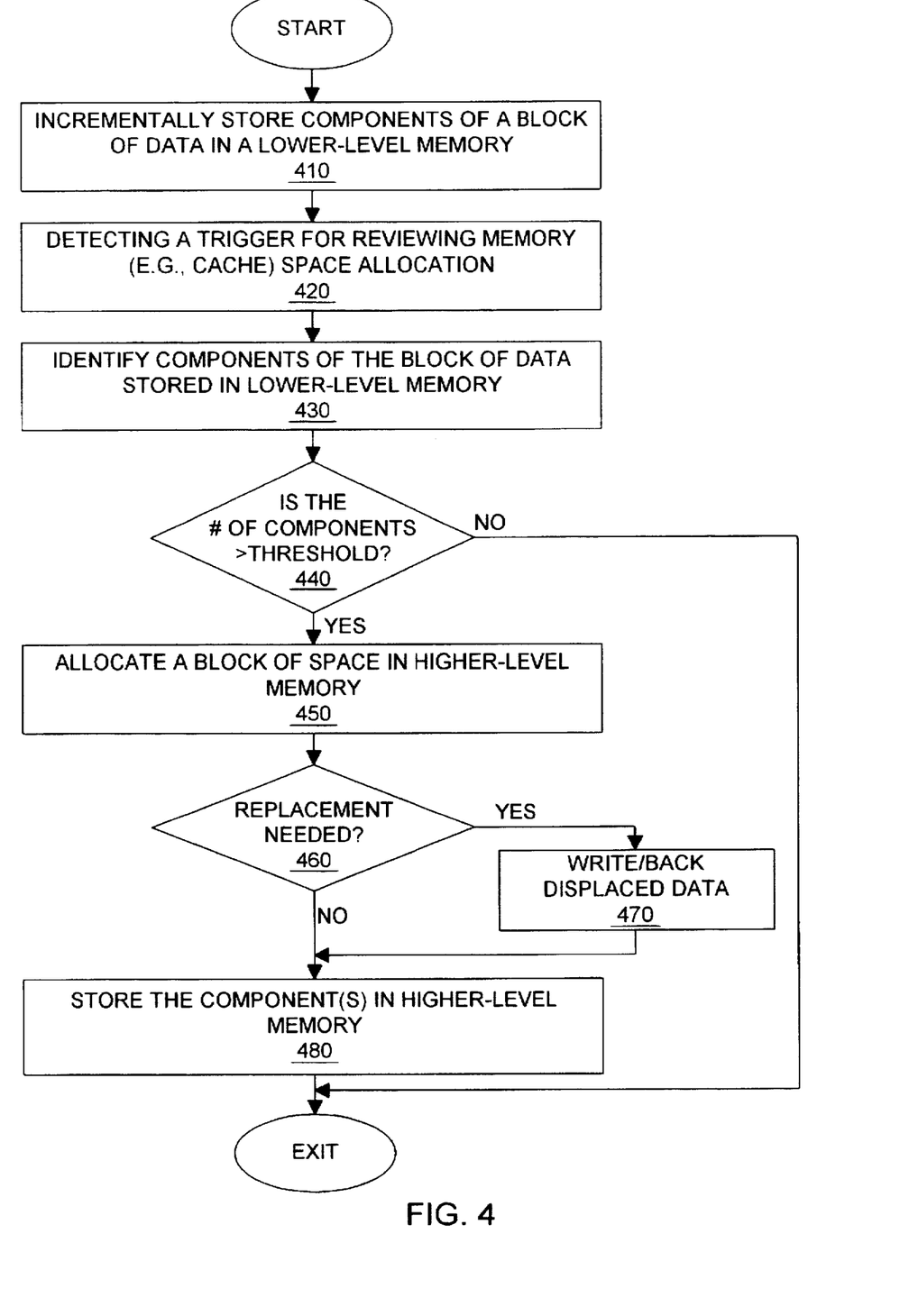
FIG. 4 is a flowchart illustrating the embodiment of the allocation scheme of FIG. 2.

Referring now to FIG. 4, components of a block of data, e.g., cache lines from a page of data, are continually stored and replaced in a lower-level cache (LLC), with the number of cached components fluctuating (step 410). In this implementation, determinations of whether to cache individual cache lines in the LLC are made in the exemplary manner described above and depicted in FIGS. 2 and 3. However, cache lines may be cached in the LLC based upon other criteria, or simply cached each time the respective cache lines are requested by a subsystem.

Eventually, subsystem 110 detects a trigger to review the allocation of space in the LLC (step 420). Note that a review of LLC space allocation can be triggered in a number of ways. For example, an allocation review may be triggered when the utilization of the higher level cache (HLC), e.g., COMA cache 114, drops below a threshold, or when the LLC is experiencing too much pressure with too many data replacements, or whenever a timer of system 100 timeouts.

Upon detecting a memory review trigger, subsystem 110 reviews the contents of the LLC (step 430) and identifies pages of data that have a substantial number of cache lines present in the LLC (step 440). If any new block(s) of data satisfy a review criteria, e.g., if the number of cache lines of a page exceeds a threshold, a block of space (page) is allocated in the HLC for the new block of data (step 450). This threshold may be pre-determined or selectable via software.

If the HLC is full, an old block of data is selected for replacement (step 460). Several variations of the block selection process are possible. For example, the selected old block of data may be the least-recent-used (LRU) block of data. Other well known memory replacement criteria include least-frequently-used.

Having selected an old block of data for replacement, a write-back operation of the old block of data may be required, depending on replacement protocol implemented in the HLC. In this example, since the HLC, e.g., COMA cache 114, is a copy-back cache, the displaced block of data is written back to its respective home location (step 470). Conversely, if the HLC is a write-through cache, then the displaced block of data can simply be discarded. In either case, components of the new block of data can now be cached in the newly-allocated block of space in the HLC (step 480). An exemplary method for flushing a block (page) of data from a copy-back cache is described in pending application "Flushing Of Cache Memory In A Computer System" by Hagersten et al., filed concurrently herewith. (Reference Number P1416)

Figure 5A:
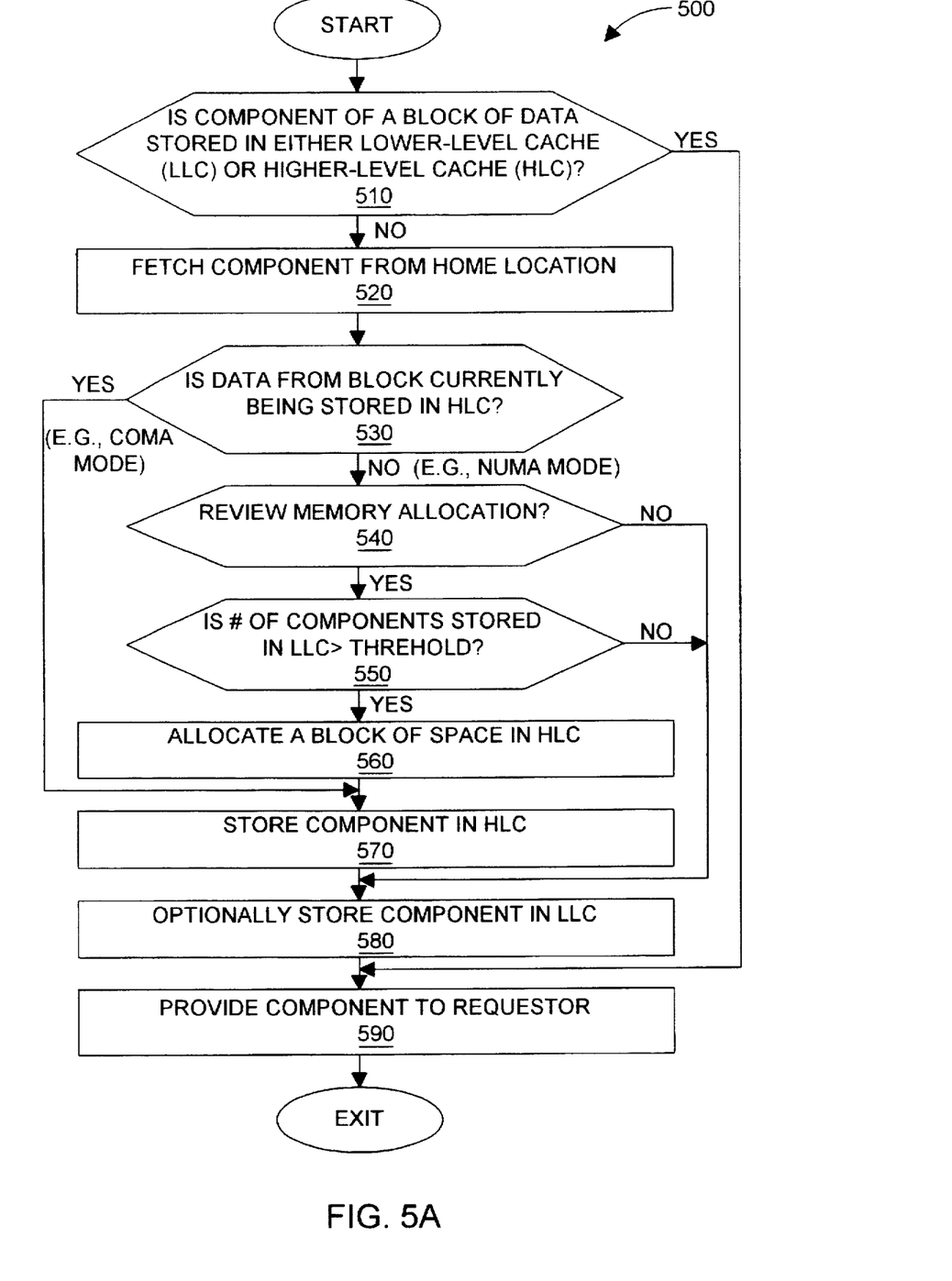
FIGS. 5A–5C are flowcharts depicting another embodiment of the invention.

In another alternative embodiment of the invention as shown in FIG. 5A, a review of memory allocation may be triggered after there is a cache miss associated with a component from a block of data. Accordingly, when there is a cache miss, i.e., a component associated with a block of data is not found in either the LLC nor the HLC (step 510), the component is fetched from the home location (step 520). If other components associated with the same block of data are currently being stored in the HLC, i.e., space for the associated block of data has already been allocated in the HLC, the component is stored within the same allocated block of space in the HLC (step 570).

Conversely, if space for the associated block has not been allocated in the HLC (step 530), and subsystem 110 determines that a review of cache allocation between the HLC and the LLC is timely (step 540), then subsystem 110 determines if the total number of associated components cached in the LLC exceeds the threshold (step 550). The threshold can be a predetermined value or a dynamically selectable value. If the threshold is exceeded, then space for the associated block is allocated in the HLC (step 560).

Figure 5B:
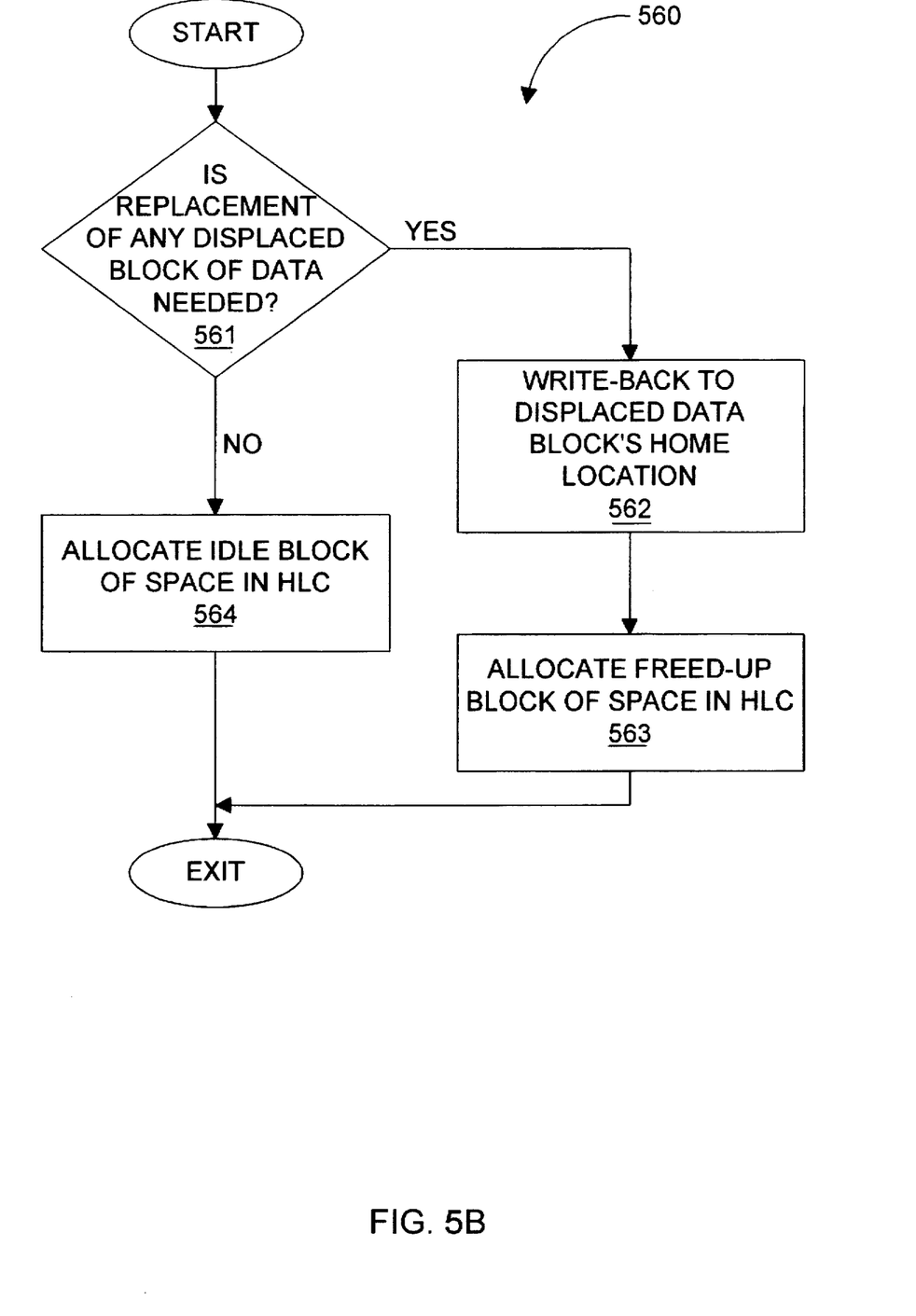

FIG. 5B depicts the HLC allocation step 560 in greater detail. If the HLC is full (step 561), depending on whether the HLC is a copy-back or a write-through cache, a write-back of the displaced data to its home location may be necessary. In this example, since the HLC, i.e., COMA cache 114, is a copy-back cache, a write-back of the displaced block is initiated before the freed-up block of space in the HLC can be rewritten (steps 562 and 563). Conversely, if there is idle space in the HLC, a block of the idle space is allocated for the new block of data (steps 561 and 564).

Referring back to FIG. 5A, having allocated space in the HLC for the new block of data, the component associated with the new block can now be stored in the HLC (step 570). In this implementation, the component is optionally stored in the LLC (step 580).

Figure 5C:
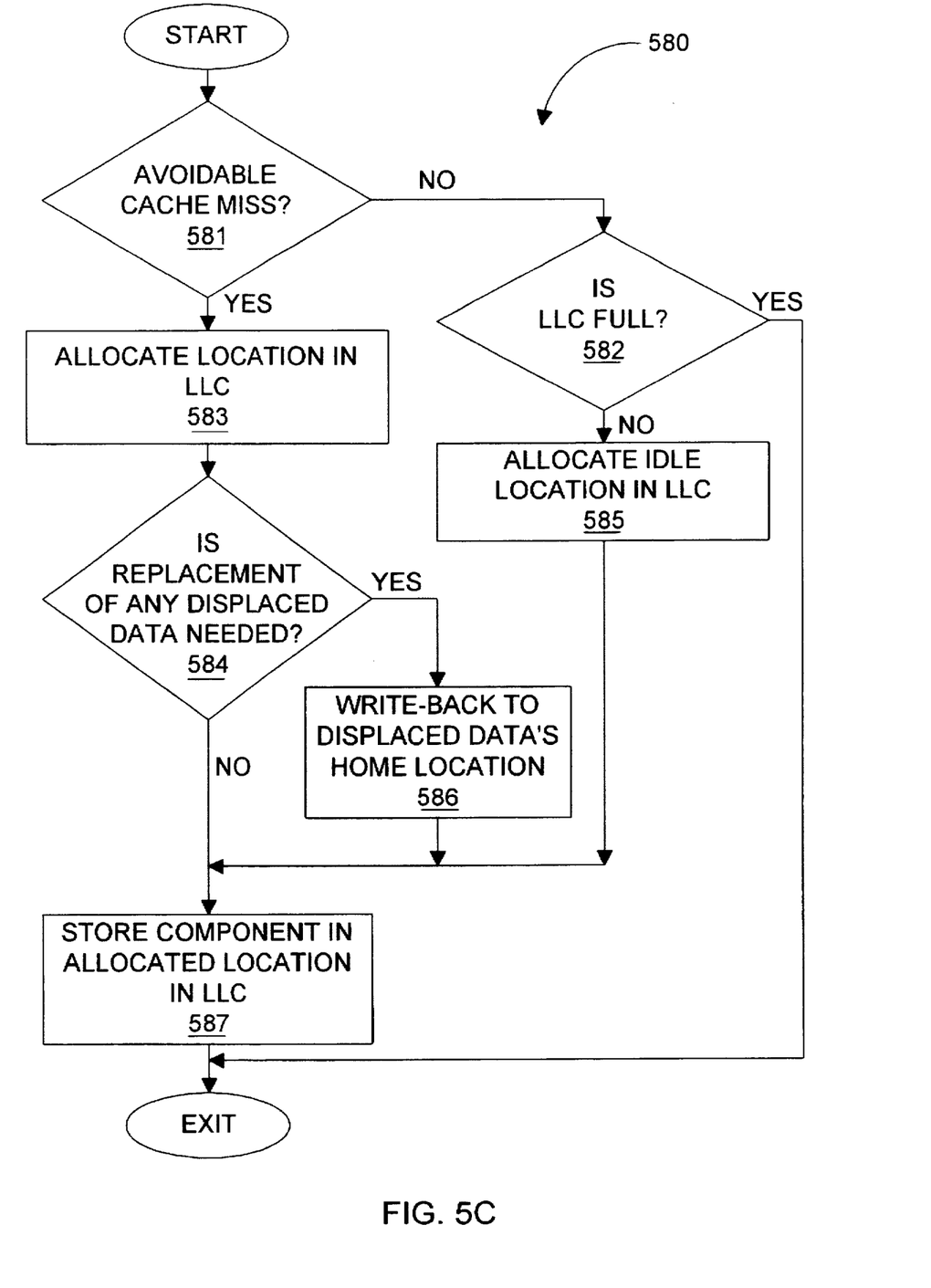

Referring now to FIG. 5C, the present invention can be practiced with the selective caching method of co-pending application "Efficient Allocation Of Cache Memory Space In A Computer System" by Hagersten et al., filed concurrently herewith. (Reference Number P1576). Accordingly, instead of simply caching in the LLC upon every cache miss, a component is cached only if there is an "avoidable" miss (step 581). An example of an avoidable miss is an "excess" miss such as a capacity miss or a conflict miss.

If the cache miss is an avoidable miss, then space is allocated in the LLC for the component (step 583). Depending on whether the LLC is a copy-back or a write-through cache, a write-back of a displaced component to its home location may be necessary. In this example, since the LLC, e.g., L2$ 113a, is a copy-back cache, a write-back of the displaced component is initiated before the new component can be stored in the LLC (steps 584, 586 and 587). Conversely, if there is idle space in the LLC, space is allocated and the new component is stored in the LLC (steps 582, 585 and 587).

Referring back to FIG. 5A, in each of the above cases, the component of data is provided to the requesting processor (step 590). Note the data can be provided to the requesting processor any time after the component has been fetched from the home location (step 520), i.e., either before or after the component is cached in the HHC and/or the LLC.

Various optimizations of the above described memory selection mechanism are possible. For example, instead of automatically caching components associated with a new block of data in the higher-level cache whenever the number of associated components cached in the lower-level cache exceeds a threshold, the new block is cached in the HLC only if the number of cached components in the LLC exceeds the number of cache hits associated with the older block currently cached the HLC and which has been selected for replacement. Other modifications and additions are also possible without departing from the spirit of the invention. Hence, the scope of the invention should be determined by the following claims.

What is claimed is:

1. A method for selecting caching modes in a computer system having a lower level cache and a higher level cache, said lower level cache including a plurality of cache lines, and said higher level cache including a plurality of pages, each said page including a plurality of cache lines, the method comprising the steps of:

incrementally storing cache-line-sized components of a page-sized block of data in at least two of said cache lines of said lower level cache;

detecting a trigger for reviewing cache space allocation;

identifying said at least two cache lines from among said plurality of cache lines of said lower level cache as storing said components of said block of data; and if the number of said identified at least two cache lines exceeds a threshold, then;

allocating one of said plurality of pages of said higher level cache; and storing said identified at least two caches lines to corresponding cache lines of said allocated page of said higher level cache.

2. A method for using memory space in a computer system having a lowerlevel memory (LLC) and higher-level memory (HLC), the method comprising the steps of:

incrementally storing components of a data block in said lower-level memory;

detecting when a number of said components stored in said lower-level memory exceeds a threshold; and upon said detection:

storing said components of said block of data in said higher-level memory.

3. The method of claim 2 wherein said lower-level and higher-level memories are caches, and said lower-level memory including a plurality of cache lines, and said higher-level memory including a plurality of pages, each said pages including a plurality of cache lines, and wherein said components are cache-line-sized and said block of data is page-sized.

4. The method of claim 3 wherein said computer system has a hybrid cache-only memory architecture/non-uniform memory architecture (COMA/NUMA), and storing in said lower-level memory corresponds to storing in a NUMA mode, while storing in said higher-level memory corresponds to storing in a COMA mode.

5. The method of claim 2 wherein said incremental storing step is performed only if an associated cache miss in said LLC was an avoidable cache miss.

6. The method of claim 5 wherein said avoidable cache miss is an access miss such as a capacity miss or a conflict miss.

7. A computer system comprising:

a processor;

a main memory coupled to said processor and configured to store blocks of data, each said block including a plurality of data components;

a lower-level cache (LLC) coupled to said processor and configured to cache copies of said data components;

a higher-level cache (HLC) coupled to said LLC and configured to cache copies of said blocks of data; and a counter coupled to said LLC and configured to determine when a number of data components associated with one of said blocks which have been cached in said LLC exceeds a threshold, said counter causing said cached data components of said one block of data to be cached in said HLC.

8. The computer system of claim 7 wherein said lower-level cache including a plurality of cache lines, and said higher-level cache including a plurality of pages, each said page including a plurality of cache lines, and wherein said components are cache-line-sized and said block of data is page-sized.

9. The computer system of claim 8 wherein said computer system has a hybrid cache-only memory architecture/non-uniform memory architecture (COMA/NUMA), and storing in said lower-level cache corresponds to storing in a NUMA mode, while storing in said higher-level cache corresponds to storing in a COMA mode.

10. The computer system of claim 7 wherein said component is cached in said LLC only after the detection of an avoidable cache miss.

11. The computer system of claim 10 wherein said avoidable cache miss is an access miss such as a capacity miss or a conflict miss.

12. A cache resource allocator for a computer system having a processor, a main memory for storing blocks of data, each said block including a plurality of data components, a lower-level cache (LLC) for caching copies of said data components, and a higher-level cache (HLC) for caching copies of said blocks of data, said cache resource allocator comprising:

a counter coupled to said LLC and configured to determine when a number of data components associated with one of said blocks which have been cached in said LLC exceeds a threshold, said counter causing said cached data components of said one block of data to be cached in said HLC.

13. A computer-readable medium having code modules for allocating cache resources in a computer system having a processor, a main memory for storing blocks of data, each said block including a plurality of data components, a lower-level cache (LLC) for caching copies of said data components, and a higher-level cache (HLC) for caching copies of said blocks of data, said computer-readable comprising:

a counter code module configured to determine when a number of data components associated with one of said blocks which have been cached in said LLC exceeds a threshold; and a cache resource allocator configured to cache said data components of said one block of data in said HLC.

* * * * *